(No Model.)
R. STANLEY.
TUNNELING MACHINE.
No. 504,181. Patented Aug. 29, 1893.
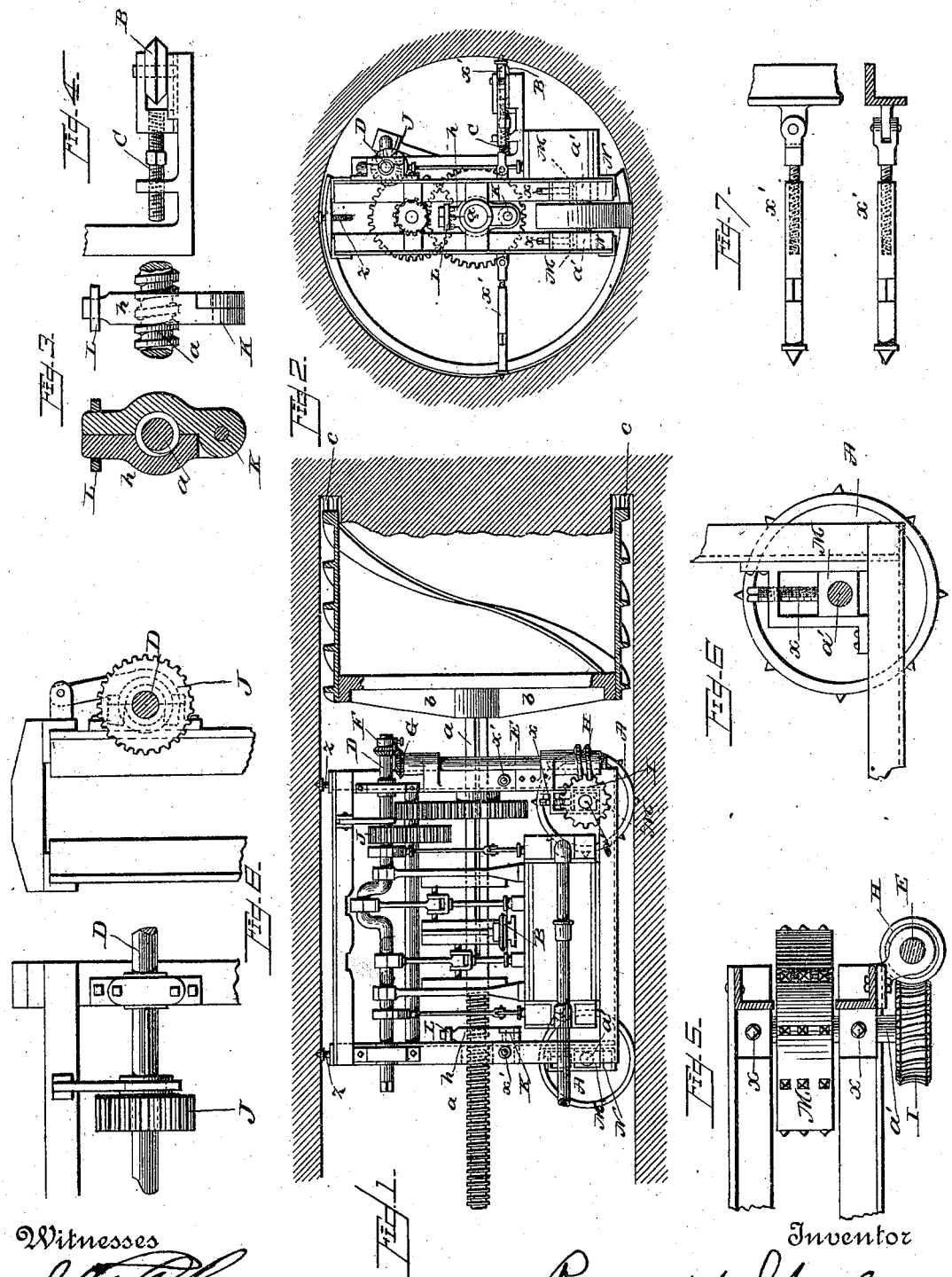
Witnesses
Inventor
Reginald Stanley
By his Attorneys
Doubleday & Bliss

UNITED STATES PATENT OFFICE.

REGINALD STANLEY, OF NUNEATON, ENGLAND.

TUNNELING-MACHINE.

SPECIFICATION forming part of Letters Patent No. 504,181, dated August 29, 1893.

Application filed December 11, 1891. Serial No. 414,709. (No model.) Patented in England February 14, 1887, No. 2,312.

*To all whom it may concern:*

Be it known that I, REGINALD STANLEY, a subject of the Queen of Great Britain, residing at Nuneaton, in the county of Warwick, England, have invented certain new and useful Improvements in Tunneling-Machines, of which the following is a specification, reference being had therein to the accompanying drawings.

This invention relates to improvements in mining and tunneling machines for which British Letters Patent numbered 2,312 and dated February 14, 1887, were granted me. The general features of the improvements, as well as the details of the particular form of machine selected here for the purpose of illustration, will be readily understood upon reference to the accompanying drawings.

Figure 1 represents a side elevation of a machine embodying my improvement. Fig. 2 is a rear elevation of my machine represented as being at work. Fig. 3 is an enlarged view of the divisible nut. Fig. 4 shows in detail one of the steadying devices. Fig. 5 is a plan view partly in section of part of the frame advancing mechanism. Fig. 6 is a side view of the wheel adjusting device. Fig. 7 shows the side braces for the frame. Fig. 8 shows enlarged the sliding wheel on the power shaft.

According to my present improvement, instead of running the machine forward on rails, as in my earlier patent, the laying and regulating of which rails involves a considerable expenditure of time and labor, I mount the whole machine on central wheels or rollers A, A, which run directly on the floor of the heading, and which work tandem fashion in the center of the floor, as shown in Fig. 2. I also provide a side or strengthening or steadying wheel B (or wheels) which keep the machine upright while being run forward, and in proper position for fixing it preparatory to, and after it is fixed for cutting a fresh distance forward in the annular groove. The wheel B is regulated by means of a right and left hand screw pin C (or otherwise) so as to be withdrawn or lengthened, thus serving to regulate the position of the machine in the heading. I generally have both of the central carrying wheels A to run loose in their bearings, but sometimes by means of suitable engines and gearing attached to the machine and driven by compressed air or other suitable means and acting upon the central front wheel or roller A as shown (or upon another wheel or wheels) that is advantageously spiked or roughened and which works into or against the circumference of the heading after throwing the central shaft with its arms or cutters out of gear by sliding the small spur wheel J along the crank shaft out of gear, I cause the whole to be advanced automatically. The front wheel or roller A is driven from the engine crank shaft D by means of a vertical shaft E and bevel wheels F, G, which can be thrown in and out of gear; a worm H on the shaft E gears with the worm wheel I on the axle $a'$ of the front central carrying wheel A as shown. When this gearing is set in motion, and the spur pinion A on the crank shaft D that causes the central shaft $a$ to revolve, is thrown out of gear, and front central carrying wheel A is caused to revolve and bite on or into the floor of the heading, and causes or helps to cause the machines or that part of the machine that moves forward between the cutting, to advance as required.

According to my present improvement I make the screw threaded nut or block $h$, in which works the central or cutting shaft $a$, in two parts, so that it can open on a hinge K attached to the frame of the machine and be held closed when required, by a clip L (or by other suitable means) so that when the block is closed and secured by the clip L, it causes the shaft $a$ with the arms $b\ b$ and the cutters $c\ c$ to work. For this purpose the central carrying wheels or rollers A, A, have their axles $a'$, $a'$, working in bearings, M, M, which can, by means of set screws $x, x$, or by other means, be moved up or down, in boxes, or brackets, N, N, attached to the frame of the machine at the front and back, as shown, or at the back only, the set screws $x, x$, passing through the tops of the boxes, or brackets, N, N, and working on or against the bearings M, M, that contain the axles $a'$, $a'$, of the central carrying wheels A, A.

The machine is fixed and held in position while cutting the annular groove by means of rollers A, A, on which it is carried, and by screw-pins $z, z$, screwing into the roof or in the sides of the heading, as shown, by wheels or rollers working against the roof and sides of the heading. The side screw-pins $x'$ $x'$ for the side wheel or roller B are also used to change the direction of, or guide, the machine to the right or to the left hand, as may be desired, and thereby alter the direction in which the annular groove is to be cut. The back carrying wheel A I prefer to make smooth on its face, so as to be easily moved to the right or to the left hand, as may be desired, by the direction of the back telescopic screw-pin $x'$. By this improved construction it will be obvious that a great saving will be effected in the time occupied in moving the machine forward between the cutting operations, and that the machine with the central carrying wheels or rollers working in the center of the floor of the heading can be more readily and accurately placed in the exact position to allow of its being fixed ready for advancing the next cutting in the direction it is desired to cut. The central wheels or rollers working on the floor of the heading, and the side wheels or rollers serve not only to carry and steadily guide the machine, but also to hold it in position while the cutting operation is being performed. A much smaller expenditure of labor is required by this system of moving forward and fixing the machine than has heretofore been the case.

I do not herein claim any of the subjects-matter set forth in the claims in my co-pending application, Serial No. 364,378, filed September, 1890, for the reissue of Patent No. 414,893, preferring to claim in said case No. 364,378 all patentable matters which are common to the machine therein and to the machine herein.

What I claim is—

1. In a tunneling machine, the combination of the bed frame, means for fastening the bed stationary, the cutting apparatus, the cutter frame or support advancing relatively to the bed when the cutters are at work, the engine on the machine detachably connected to the cutters, the supporting wheels for the bed, and means connecting said engine to said wheels, substantially as set forth.

2. In a tunneling machine, the combination of the bed, the cutting apparatus, the engine detachably connected to the cutters, the supporting wheels, the screws carried by the bed and engaging with the tunnel wall, and means for detachably connecting the engine to the said supporting wheels substantially as set forth.

3. In a tunneling machine, the combination of the bed, the supporting and transporting wheels for the bed, the cutters the cutter frame or support, the abutment for the thrust of the cutters when at work, the cutter rotating engine on the machine detachably connected to the wheels and the feed mechanism adapted to alternately advance the cutters and the bed frame, substantially as set forth.

4. In a tunneling machine, the combination of the bed, the cutting apparatus, the cutter frame or support movable relatively to the bed when the cutters are at work, the supporting wheels, the engine on the machine, detachably connected to the cutters and detachably connected to the wheels, substantially as set forth.

5. In a tunneling machine, the combination of the bed, the cutting apparatus, the wheels, the engine on the machine means for detachably connecting the supporting wheels to the engine, the threaded shaft and nut for advancing the cutters and adapted to be thrown out of action in relation to the cutter substantially as set forth.

In testimony whereof I affix my signature in presence of two witnesses.

REGINALD STANLEY.

Witnesses:
W. H. HARRIS,
FREDERICK BAKER.